United States Patent
Kabasawa

(10) Patent No.: US 7,906,248 B2
(45) Date of Patent: Mar. 15, 2011

(54) CONNECTING STRUCTURE, FLOW PATH CONTROL SECTION, FUEL CELL-TYPE POWER GENERATION DEVICE, AND ELECTRONIC APPARATUS

(75) Inventor: Yasunari Kabasawa, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 804 days.

(21) Appl. No.: 11/726,555

(22) Filed: Mar. 22, 2007

(65) Prior Publication Data
US 2007/0231658 A1 Oct. 4, 2007

(30) Foreign Application Priority Data

Mar. 28, 2006 (JP) .................................. 2006-088205
Sep. 15, 2006 (JP) .................................. 2006-251109

(51) Int. Cl.
*H01M 8/04* (2006.01)
*C25B 11/00* (2006.01)

(52) U.S. Cl. .......... 429/513; 429/515; 204/450; 204/600

(58) Field of Classification Search .............. 429/12–46, 429/513, 515; 204/450–455, 600–605; 417/48; 73/863–864; 422/99, 100; 210/689, 690; 347/55
See application file for complete search history.

(56) References Cited

U.S. PATENT DOCUMENTS

| | | | | |
|---|---|---|---|---|
| 3,947,227 | A * | 3/1976 | Granger et al. | ............... 431/118 |
| 4,359,510 | A | 11/1982 | Taskier | |
| 4,438,185 | A | 3/1984 | Taskier | |
| 6,913,844 | B2 * | 7/2005 | Butcher et al. | .................. 429/17 |
| 7,232,623 | B2 | 6/2007 | Yoshioka et al. | |
| 2004/0151962 | A1 * | 8/2004 | Adams | ............................. 429/34 |
| 2005/0066520 | A1 | 3/2005 | Shu et al. | |
| 2005/0282047 | A1 | 12/2005 | Kimura et al. | |
| 2007/0172711 | A1 | 7/2007 | Yoshioka et al. | |
| 2008/0260542 | A1 * | 10/2008 | Nishikawa et al. | ............. 417/48 |

FOREIGN PATENT DOCUMENTS

| | | |
|---|---|---|
| JP | 2000-265963 A | 9/2000 |
| JP | 2002-202168 A | 7/2002 |
| JP | 2004-276224 A | 10/2004 |
| JP | 2006-311796 A | 11/2006 |
| TW | 567637 B | 12/2003 |
| TW | 1225320 B | 12/2004 |
| TW | 1228843 B | 3/2005 |
| WO | WO 9510344 A1 * | 4/1995 |
| WO | WO2005120696 | * 12/2005 |

OTHER PUBLICATIONS

Japanese Office Action (and English translation) dated Jul. 15, 2008, issued in a counterpart Japanese Application.
Taiwanese Office Action dated Sep. 6, 2010 (and English translation thereof) in counterpart Taiwanese Application No. 096110435.

* cited by examiner

*Primary Examiner* — Basia Ridley
*Assistant Examiner* — Jonathan G Leong
(74) *Attorney, Agent, or Firm* — Holtz, Holtz, Goodman & Chick, PC

(57) ABSTRACT

Disclosed herein is a connecting structure for connecting to an electro-osmotic flow pump with electrodes formed on both surfaces of electro-osmotic material, including: a first liquid absorber for absorbing liquid; and a second liquid absorber for absorbing the liquid, the second liquid absorber being superposed on the first liquid absorber and being flexible; wherein a surface of the second liquid absorber, which is opposite to a surface which is in contact with the first liquid absorber, is in contact with the electro-osmotic flow pump.

9 Claims, 14 Drawing Sheets

FIG. 16

(SIXTH MICRO REACTOR PORT 17)
CARBON MONOXIDE REMOVER 9 → HOLE265 → HOLE245 → HOLE235 → HOLE215 → HOLE175 → HOLE165

ANODE21 ← HOLE259 ← HOLE252 ← HOLE236 ← HOLE208 ← HOLE190 ← HOLE156 ← HOLE135
(FIRST POWER GENERATION CELL PORT 24)      HOLE125

FIG. 17

(SECOND POWER GENERATION CELL PORT 25)
ANODE21 → HOLE257 → HOLE250 → HOLE228 → HOLE206 → HOLE191 → HOLE155

COMBUSTOR 10 ← HOLE264 ← HOLE244 ← HOLE234 ← HOLE214 ← HOLE174 ← HOLE164 ← HOLE134
(FIFTH MICRO REACTOR PORT 16)      HOLE124

FIG. 18

COMBUSTOR 10 → HOLE263 → HOLE243 → HOLE233 → HOLE213 → HOLE173 → HOLE163
(FOURTH MICRO REACTOR PORT 15)

EXHAUST ← NOTCH 158 ← HOLE133
         NOTCH 188   HOLE123
         NOTCH 205

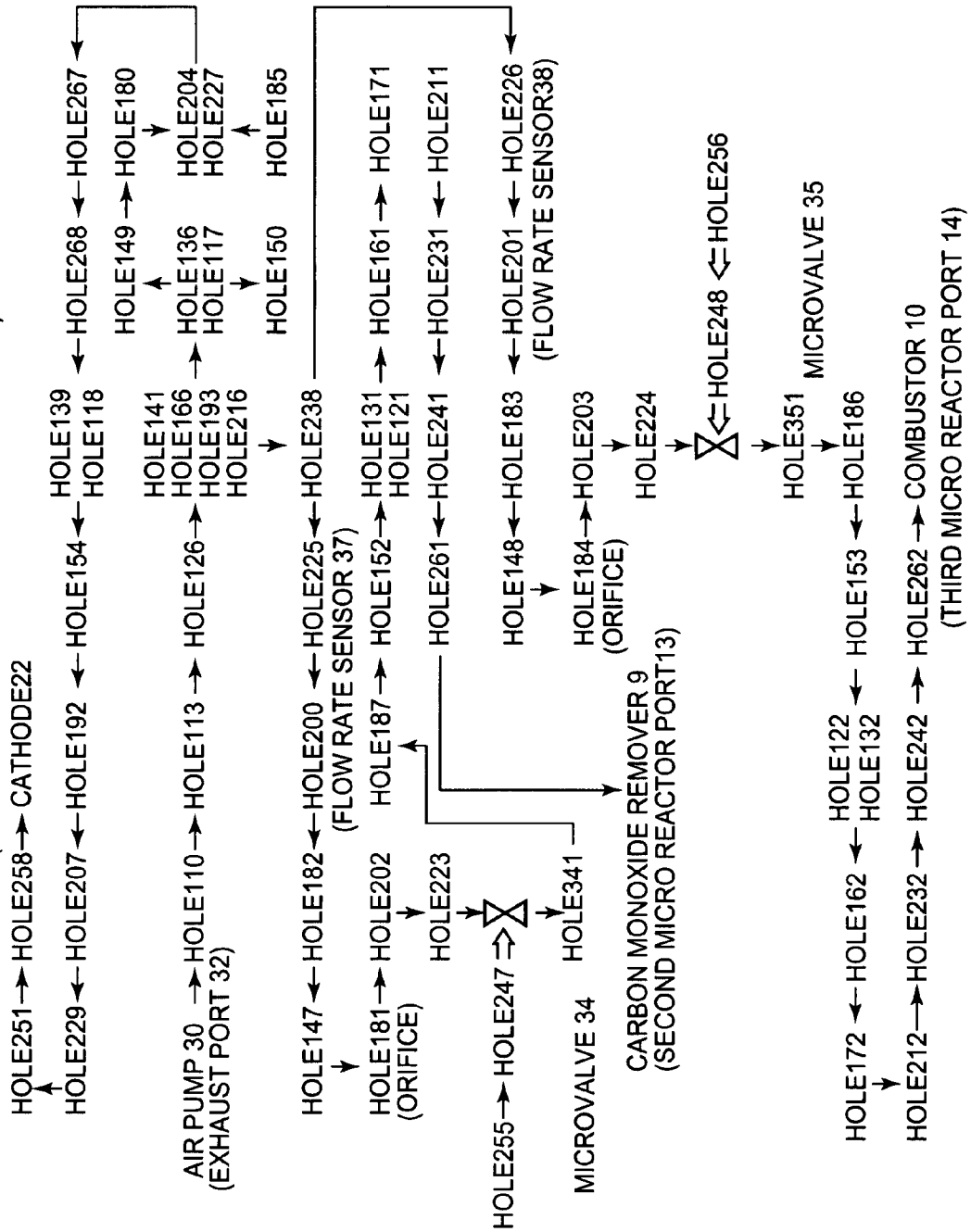

FIG. 20

CATHODE22 → HOLE266 → HOLE253 → HOLE237 → NOTCH 209
(FOURTH POWER                                NOTCH 189
GENERATION CELL PORT 27)                     NOTCH 157 → EXHAUST
                                             NOTCH 140
                                             NOTCH 119

VOLTAGE

SENDING DIRECTION OF LIQUID

CONNECTING STRUCTURE, FLOW PATH CONTROL SECTION, FUEL CELL-TYPE POWER GENERATION DEVICE, AND ELECTRONIC APPARATUS

BACKGROUND OF THE INVENTION

1. Field of the Invention

The present invention relates to a connecting structure for connecting to an electro-osmotic flow pump using an electro-osmotic phenomenon, a flow path control section including the connecting structure, a fuel cell-type power generation device including the flow path control section, and an electronic apparatus including the fuel cell-type power generation device.

2. Description of Related Art

Recently, fuel cells have attracted attention as a clean power source having a high energy conversion efficiency and have been widely used for a fuel cell automobile, a mobile device, and an electric home. A fuel cell is classified into two types of the reforming one and the direct one. The reforming-type fuel cell is based on a method to generate hydrogen out of fuel and water by using a reformer and to subsequently supply hydrogen to a power generation cell (fuel cell body). The direct-type fuel cell is based on a method to supply fuel and water to a power generation cell without reforming fuel and water. In any of these methods, a pump is used as a power source for sending fuel and water. Pumps include the mechanical ones such as the centrifugation-type one, the capacity rotation-type one, and the capacity reciprocation one. Many patent applications relating to a pump using a piezoelectric actuator in particular have been filed in the field of mobile devices requiring a small size. However, a mechanically operating pump using a piezoelectric actuator or the like has a problem in the life of the moving part thereof. Thus, such an electro-osmotic flow pump that sends liquid without having a mechanical moving part has been suggested.

An electro-osmotic flow pump uses the electro-osmotic phenomenon and has a structure as shown in FIG. 24. As shown in FIG. 24, the electro-osmotic flow pump comprises an electro-osmotic material 502 filled in a tube member 504; an electrode 501 provided at the upstream side of the electro-osmotic material 502; and an electrode 503 provided at the downstream side. The electro-osmotic material 502 is made of, for example, dielectric material, such as, silica fiber, provided in a direction of the flow of the tube member 504.

The electro-osmotic flow pump operates based on the principle as described below. Specifically, when the dielectric material of the electro-osmotic material 502 is in contact with liquid, the surface of the dielectric material is charged and counter ions in the liquid are collected at the neighborhood of the contact interface to cause excessive charge. When a voltage is applied between the electrode 501 and the electrode 503 to cause an electric field in the electro-osmotic material 502, counter ions in the liquid move and the liquid entirely flows due to the viscosity of the liquid. When the electro-osmotic material 502 is silica, the surface of silica becomes Si—O$^-$ and the surface of silica is negatively charged to collect positive ions (counter ions) in the liquid and to cause excessive positive charge in the liquid. Thus, the fluid flows in the direction as shown in FIG. 24 by applying a voltage so that the potential of the electrode 501 is higher than the potential of the electrode 503.

The electro-osmotic flow pump is advantageous in that no moving part is used, the structure is simple, the size can be reduced, and neither pulsation nor noise is caused and the like. However, it is required to sufficiently permeate liquid in the electro-osmotic material during the operation of the pump. In a conventional connecting structure of an electro-osmotic flow pump, it is difficult to sufficiently permeate the liquid in the electro-osmotic material. Therefore, the phenomenon that the liquid was not sufficiently sent was caused.

In view of them, the present invention has been made in order to solve the above-described problem. It is an object of the present invention to sufficiently permeate liquid in electro-osmotic material during the operation of an electro-osmotic flow pump.

SUMMARY OF THE INVENTION

According to a first aspect of the invention, a connecting structure for connecting to an electro-osmotic flow pump having electrodes formed on both surfaces of electro-osmotic material, comprises:

a first liquid absorber for absorbing liquid; and a second liquid absorber for absorbing the liquid, the second liquid absorber being superposed on the first liquid absorber and being flexible;

wherein a surface of the second liquid absorber, which is opposite to a surface which is in contact with the first liquid absorber, is in contact with the electro-osmotic flow pump.

According to a second aspect of the invention, a flow path control section, comprises:

a substrate comprising a flow path therein;

a first liquid absorber for absorbing liquid, the first liquid absorber being formed by integrating a plate-like member with a bar-like member raised from the plate-like member;

a second liquid absorber for absorbing the liquid, the second liquid absorber being superposed on the plate-like member and being flexible; and electro-osmotic material superposed on the second liquid absorber and having electrodes formed on a surface which is in contact with the second liquid absorber and an opposite surface of the surface, respectively, wherein the second liquid absorber, the electro-osmotic material and the plate-like member are provided in a flow path formed in the substrate and the bar-like member protrudes to outside of the substrate.

According to a third aspect of the invention, a fuel cell-type power generation device, comprises:

a flow path control section; and a power generation cell for taking out electricity from liquid supplied to the flow path control section;

wherein the flow path control section comprises:

a substrate comprising a flow path therein;

a first liquid absorber for absorbing liquid, the first liquid absorber being formed by integrating a plate-like member with a bar-like member raised from the plate-like member;

a second liquid absorber for absorbing the liquid, the second liquid absorber being superposed on the plate-like member and being flexible; and electro-osmotic material superposed on the second liquid absorber and having electrodes formed on a surface which is in contact with the second liquid absorber and an opposite surface to the surface, respectively, wherein the second liquid absorber, the electro-osmotic material and the plate-like member are provided in the flow path formed in the substrate and the bar-like member protrudes to outside of the substrate.

According to a fourth aspect of the invention, an electronic apparatus, comprises:

a flow path control section;

a power generation cell for taking out electricity from liquid supplied to the flow path control section; and an electronic apparatus body that operates based on the electricity generated by the fuel cell-type power generation device;

wherein the flow path control section comprises:

a substrate comprising a flow path therein;

a first liquid absorber for absorbing liquid, the first liquid absorber being formed by integrating a plate-like member with a bar-like member raised from the plate-like member;

a second liquid absorber for absorbing the liquid, the second liquid absorber being superposed on the plate-like member and being flexible; and electro-osmotic material superposed on the second liquid absorber and having electrodes formed on a surface which is in contact with the second liquid absorber and an opposite surface of the surface, respectively, wherein the second liquid absorber, the electro-osmotic material and the plate-like member are provided in the flow path formed in the substrate and the bar-like member protrudes to outside of the substrate.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 16 shows a path of a hydrogen supply flow path from a carbon monoxide remover to an anode;

FIG. 17 shows a path of a combustion gas supply flow path from an anode to a combustor;

FIG. 18 shows a path of an exhaust gas flow path from a combustor to outside;

FIG. 19 shows a path of an air supply flow path from an air pump to a cathode, a carbon monoxide remover, and a combustor;

FIG. 20 shows a path of an air exhaust flow path from a cathode to exhaust the gas;

DETAILED DESCRIPTION OF PREFERRED EMBODIMENT

Hereinafter, a preferred embodiment of the present invention will be described with reference to the drawings. Although embodiments described below have technically preferable limitations for carrying out the present invention, the scope of the present invention is not limited to the following embodiments and illustrated examples.

Figure 1:
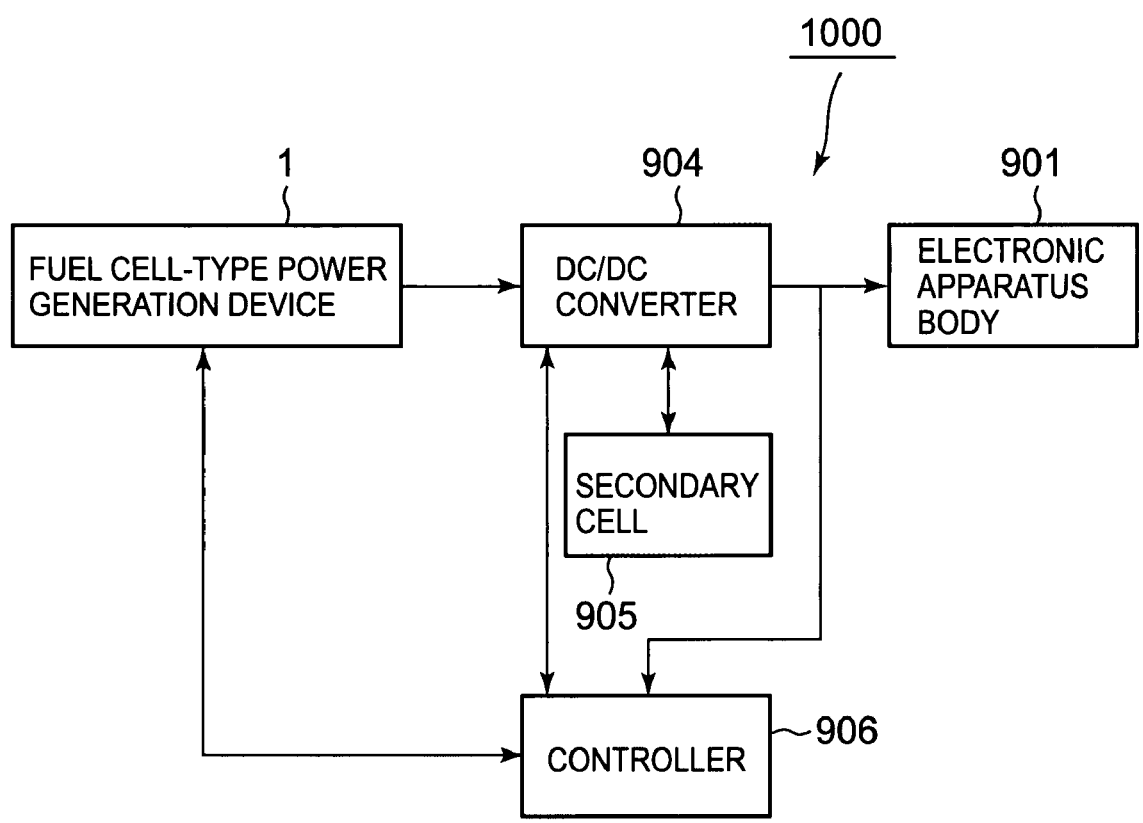
FIG. 1 is a block diagram illustrating an electronic apparatus.

FIG. 1 is a block diagram illustrating an electronic apparatus 1000. The electronic apparatus 1000 comprises: a fuel cell-type power generation device 1; a DC/DC converter 904 for converting electric energy generated by the fuel cell-type power generation device 1 to an appropriate voltage; a secondary cell 905 connected to the DC/DC converter 904; a controller 906 for controlling them; and an electronic apparatus body 901 supplied with electric energy from the DC/DC converter 904.

The fuel cell-type power generation device 1 generates electric energy to output the electric energy to the DC/DC converter 904 as described below. The DC/DC converter 904 has the function to convert electric energy generated by the fuel cell-type power generation device 1 to an appropriate voltage to subsequently supply the electric energy to an electronic apparatus body 901 or a controller 906, and the function to charge the electric energy generated by the fuel cell-type power generation device 1 to the secondary cell 905 so that the electric energy stored in the secondary cell 905 can be supplied to the electronic apparatus body 901 and the controller 906 when the fuel cell-type power generation device 1 is not in operation. The controller 906 controls the fuel cell-type power generation device 1 and the DC/DC converter 904 so as to stably supply electric energy to the electronic apparatus body 901.

Next, the fuel cell-type power generation device 1 will be described in detail.

Figure 2:
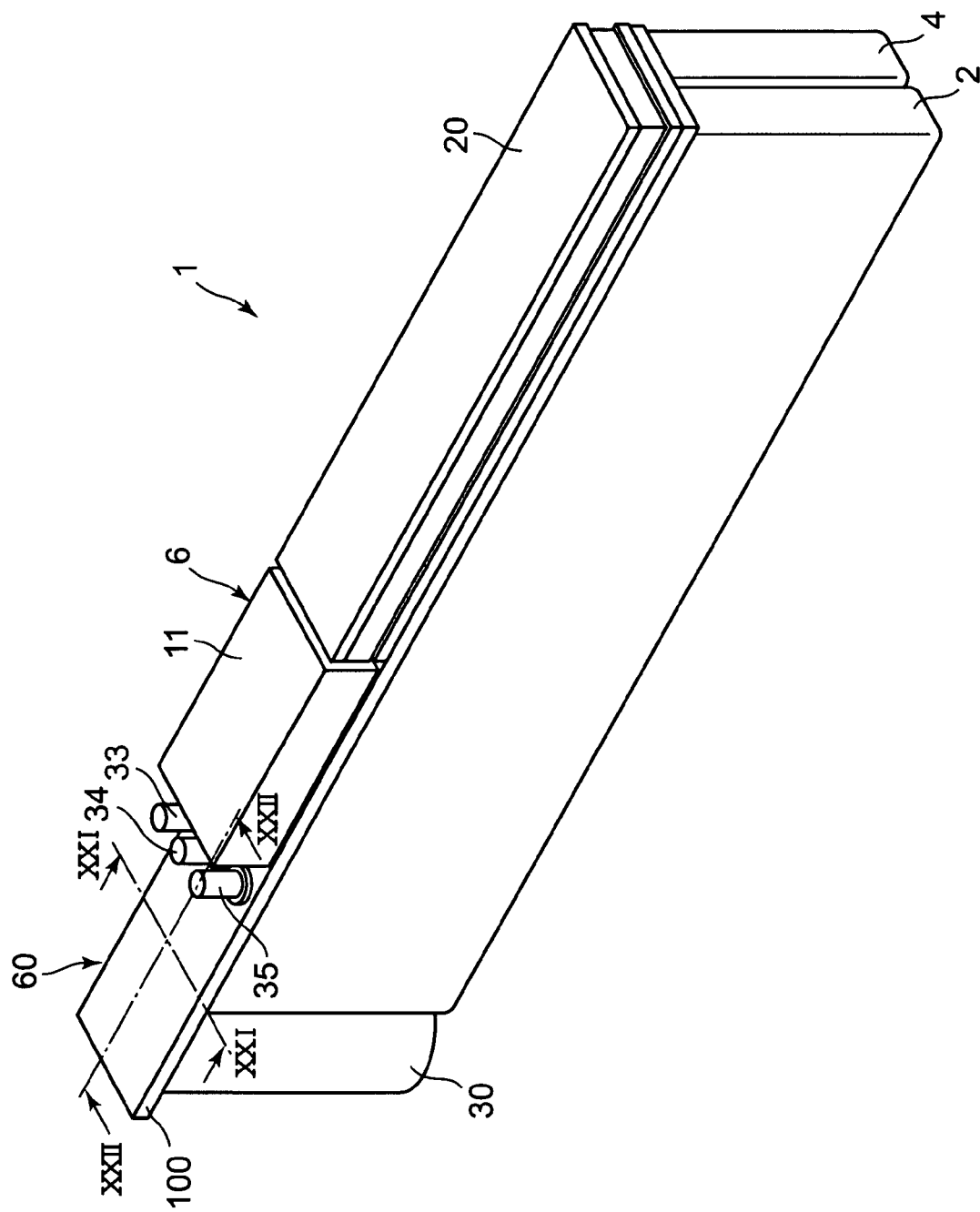
FIG. 2 is a perspective view illustrating a fuel cell-type power generation device.
Figure 3:
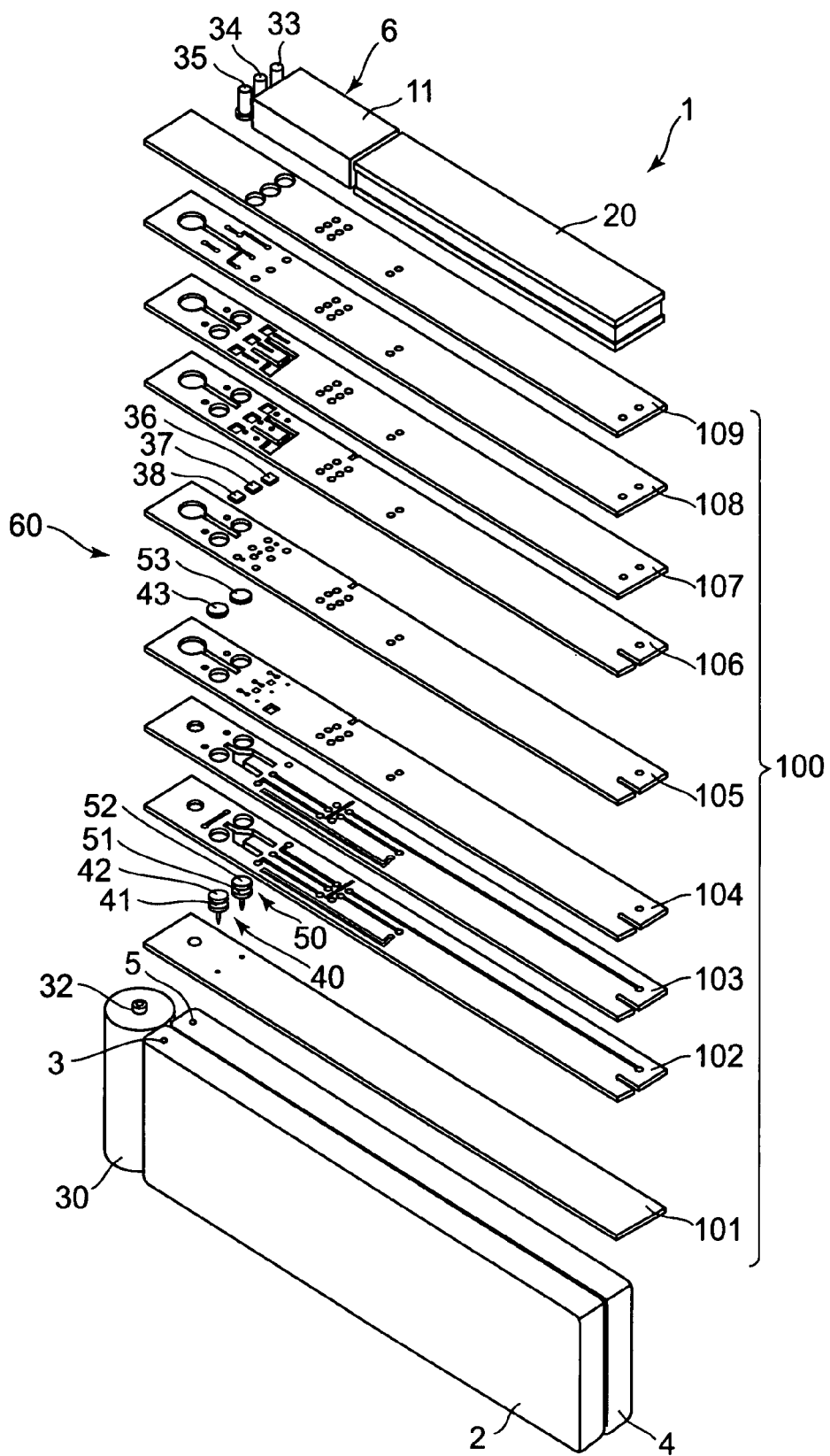
FIG. 3 is an exploded perspective view illustrating a fuel cell-type power generation device.
Figure 4:
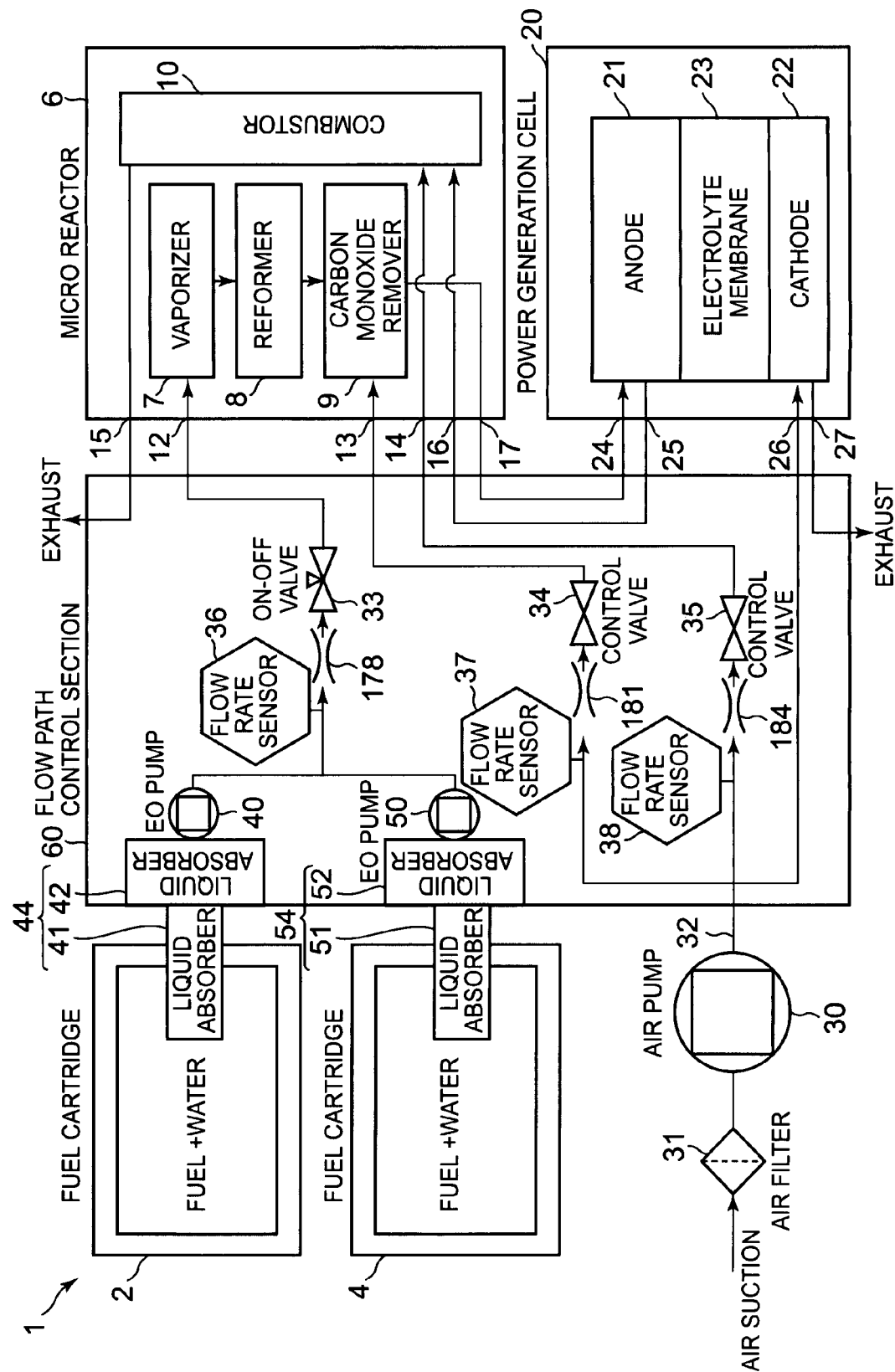
FIG. 4 is a block diagram illustrating a fuel cell-type power generation device.

FIG. 2 is a perspective view illustrating the fuel cell-type power generation device 1. FIG. 3 is an exploded perspective view illustrating the fuel cell-type power generation device 1. FIG. 4 is a block diagram illustrating the fuel cell-type power generation device 1.

As shown in FIG. 2 and FIG. 3, the fuel cell-type power generation device 1 has a system having two fuel cartridges 2 and 4. The fuel cartridge 2 is shaped to be a rectangular parallelepiped-like box. The fuel cartridge 2 stores mixed liquid of fuel and water therein. On an upper face of the fuel cartridge 2, a fuel exhaust hole 3 is formed. A check valve is attached to the fuel exhaust hole 3. This check valve is a duckbill valve obtained by forming flexible and elastic material (e.g., elastomer) to have a duckbill-like shape. This check valve is attached to the fuel exhaust hole 3 with the duckbill-like tip end faced to the interior of the fuel cartridge 2. The flow of fluid flowing from the fuel cartridge 2 to outside is blocked by the check valve. The fuel cartridge 4 has the same structure as that of the fuel cartridge 2. The fuel cartridge 4 stores mixed liquid of fuel and water therein and a fuel exhaust hole 5 is formed on an upper face of the fuel cartridge 4.

On the fuel cartridges 2 and 4, a flow path control section 60 is provided. The fuel cartridge 2 can be provided so as to be attached to or detached from the flow path control section 60. This flow path control section 60 comprises a multilayer substrate 100. The flow rate sensors 36 to 38 and electroosmotic flow pumps 40 and 50 are provided in the multilayer substrate 100. The microvalves 33 to 35 are provided on the multilayer substrate 100.

On the surface of the multilayer substrate 100, a micro reactor 6 is surface-mounted. As shown in FIG. 4, the micro reactor 6 is a unit of a vaporizer 7, a reformer 8, a carbon monoxide remover 9, and a combustor 10. The vaporizer 7 is connected to the reformer 8. The reformer 8 is connected to the carbon monoxide remover 9. As shown in FIG. 2 and FIG. 3, micro reactor 6 is stored in a vacuum insulation package 11.

Figure 5:
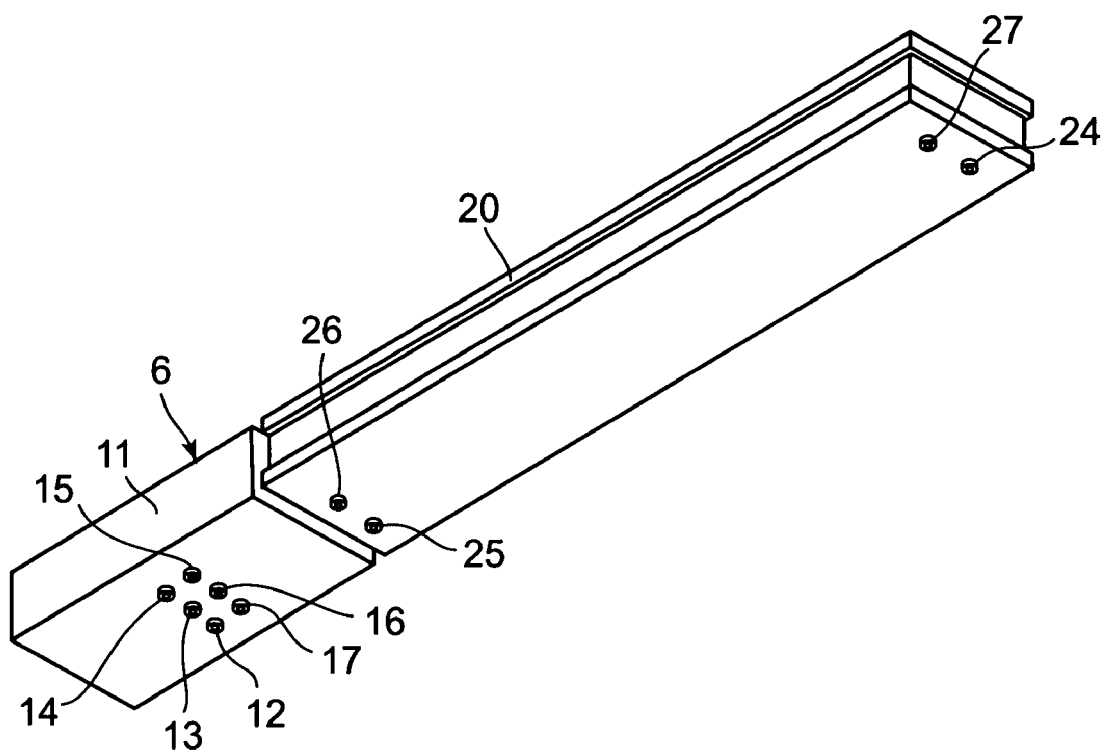
FIG. 5 is a perspective view illustrating a micro reactor and a fuel cell-type power generation device, which is seen from the lower face.
Figure 6:
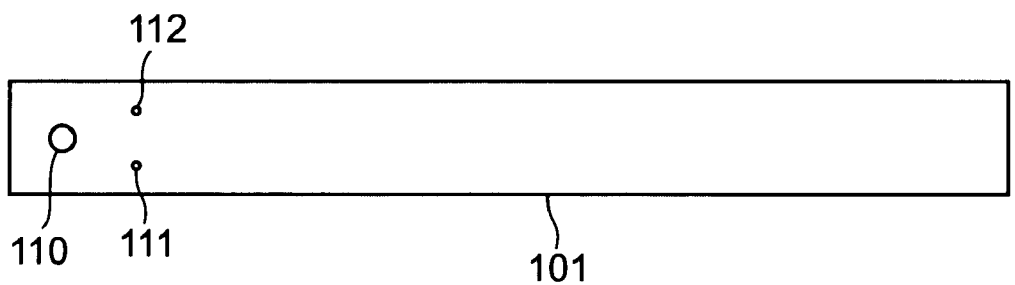
FIG. 6 is a plan view illustrating a flow path plate at the undermost layer.
Figure 7:
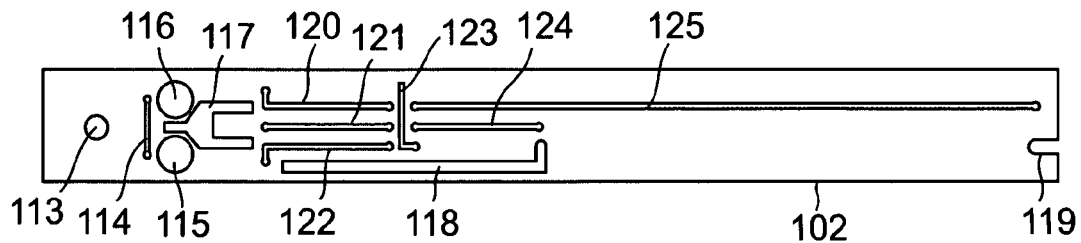
FIG. 7 is a plan view illustrating the second flow path plate from the bottom.
Figure 8:
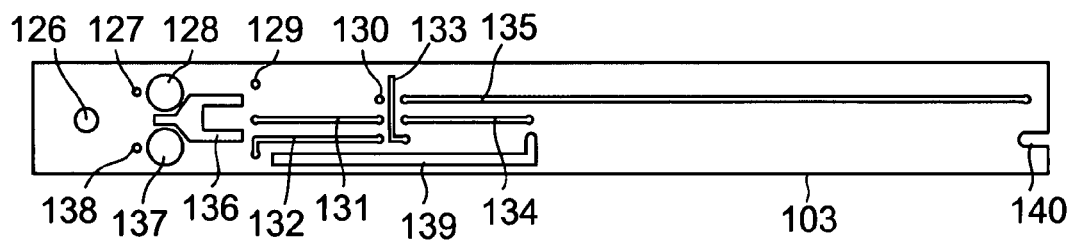
FIG. 8 is a plan view illustrating the third flow path plate from the bottom.
Figure 9:
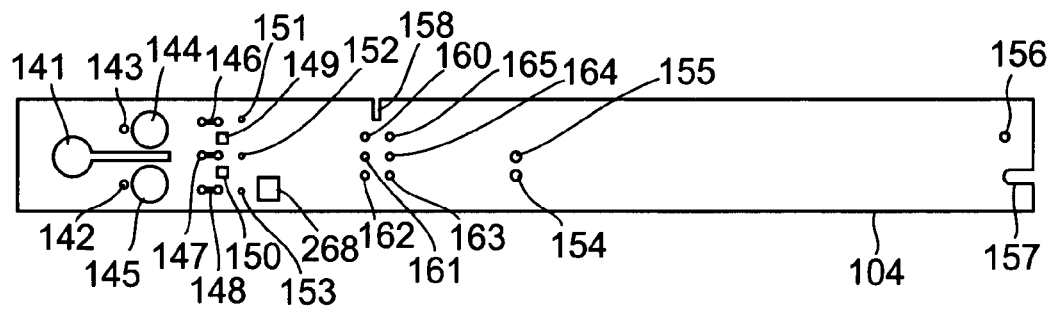
FIG. 9 is a plan view illustrating the fourth flow path plate from the bottom.
Figure 10:
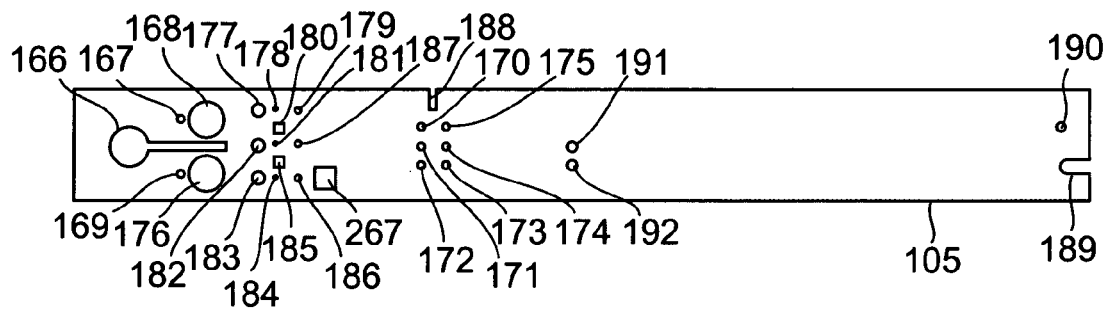
FIG. 10 is a plan view illustrating the fifth flow path plate from the bottom.
Figure 11:
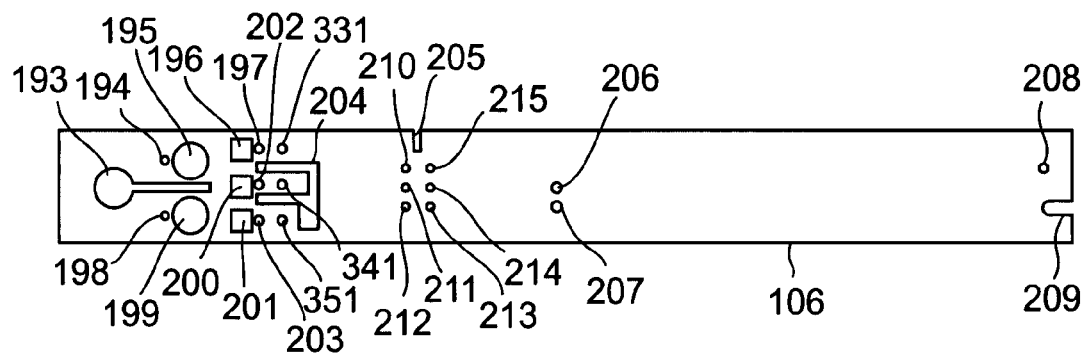
FIG. 11 is a plan view illustrating the sixth flow path plate from the bottom.
Figure 12:
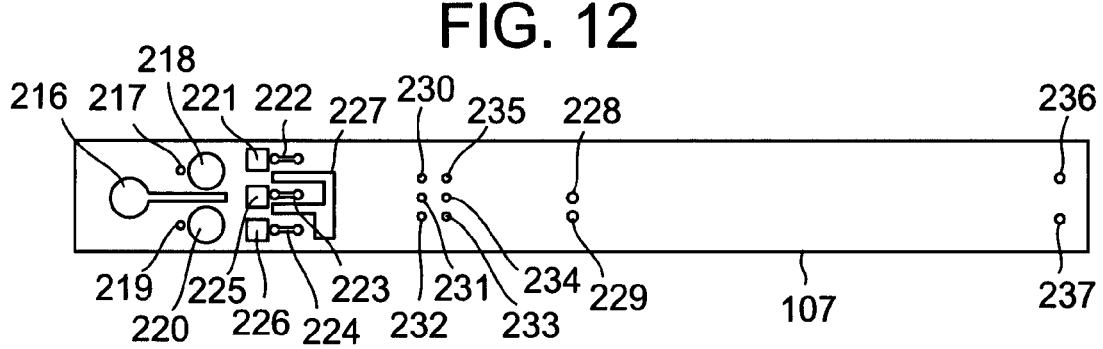
FIG. 12 is a plan view illustrating the seventh flow path plate from the bottom.
Figure 13:
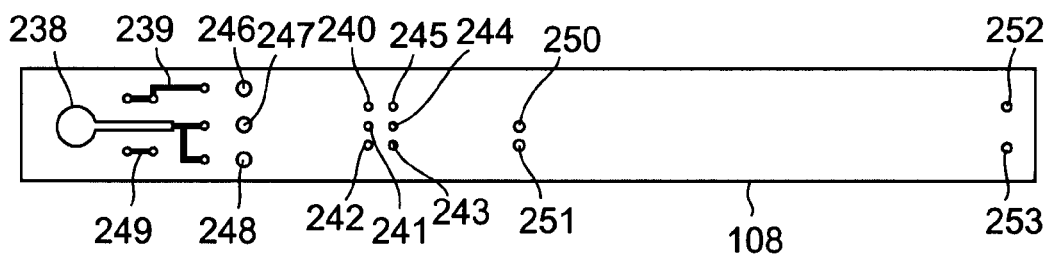
FIG. 13 is a plan view illustrating the eighth flow path plate from the bottom.
Figure 14:
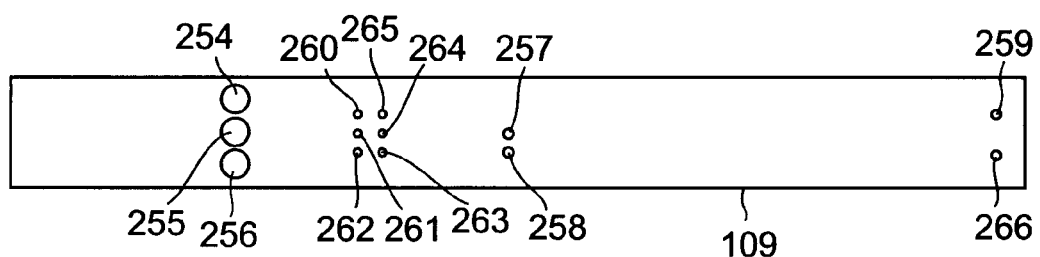
FIG. 14 is a plan view illustrating a flow path plate at the uppermost layer.

As shown in FIG. 5, on a lower face of the micro reactor 6, six ports 12 to 17 are provided. Although the details will be described later, the first micro reactor port 12 is an input port leading to a vaporizer 7, the second micro reactor port 13 is an input port leading to the carbon monoxide remover 9, the third micro reactor port 14 is an input port leading to the combustor 10, the fourth micro reactor port 15 is an output port from the combustor 10, the fifth micro reactor port 16 is an input port leading to the combustor 10, and the sixth micro reactor port 17 is an output port from the carbon monoxide remover 9, as shown in FIG. 4.

As shown in FIG. 2 and FIG. 3, on the surface of the multilayer substrate 100, the above micro reactor 6 and a power generation cell (fuel cell body) 20 are surface-mounted. As shown in FIG. 4, the power generation cell 20 is a unit composed of an anode 21 supporting catalyst; a cathode 22 supporting catalyst; and an electrolyte membrane 23 sandwiched between the anode 21 and the cathode 22. As shown in FIG. 5, on the lower face of the power generation cell 20, four ports 24 to 27 are provided. Although the details will be described later, the first power generation cell port 24 is an input port leading to the anode 21, the second power generation cell port 25 is an output port from the anode 21, the third power generation cell port 26 is an input port leading to the cathode 22, and the fourth power generation cell port 27 is an output port from the cathode 22, as shown in FIG. 4.

As shown in FIG. 2 and FIG. 3, on the lower side of the multilayer substrate 100, an air pump 30 is surface-mounted. As shown in FIG. 4, an air filter 31 is provided on the suction side of the air pump 30 so that outside air is sucked by the air pump 30 through the air filter 31. As shown in FIG. 3, on the upper face of the air pump 30, an exhaust port 32 is provided. Air sucked by the air pump 30 is exhausted from the exhaust port 32 and is supplied to each part via a flow path in the multilayer substrate 100.

As shown in FIG. 2 and FIG. 3, on the surface of the multilayer substrate 100, microvalves 33 to 35 are surface-mounted. As shown in FIG. 4, the microvalve 33 functions as an on-off valve that permits or blocks the flow of fluid by opening or closing itself. Microvalves 34 and 35 function as a control valve (variable valve) that controls the flow rate of fluid.

As shown in FIG. 3, the multilayer substrate 100 is provided by layering nine flow path plates 101 to 109 for example. The number of the plates may be changed depending on the design. The flow path plates 101 to 109 are provided by forming a metal foil of copper for example (e.g., the thickness thereof is 18 μm) on a resin substrate (e.g., the thickness thereof is 100 to 300 μm) made of polyetherimide (PEI), polyethersulphone (PES), or polyether ether ketone (PEEK) or the like, to provide a wiring pattern by etching and shaping the metal film. These are simultaneously heat-sealed to provide. The multilayer substrate 100 is provided by stacking and collectively heat-sealing the flow path plates 101 to 109. Electric connection among the layers in the multilayer substrate 100 is realized by a through hole or a via. PEEK is crystalline engineering plastic. PEEK hardly outgases and hardly elutes metallic ions. The continuous use temperature thereof is 260 degrees. PEEK also has a gas permeability that is 1/1000 to 1/100 of those of polystyrene (PS) and polycarbonate (PC) and is suitable for a flow path in which liquid flows.

Figure 15:
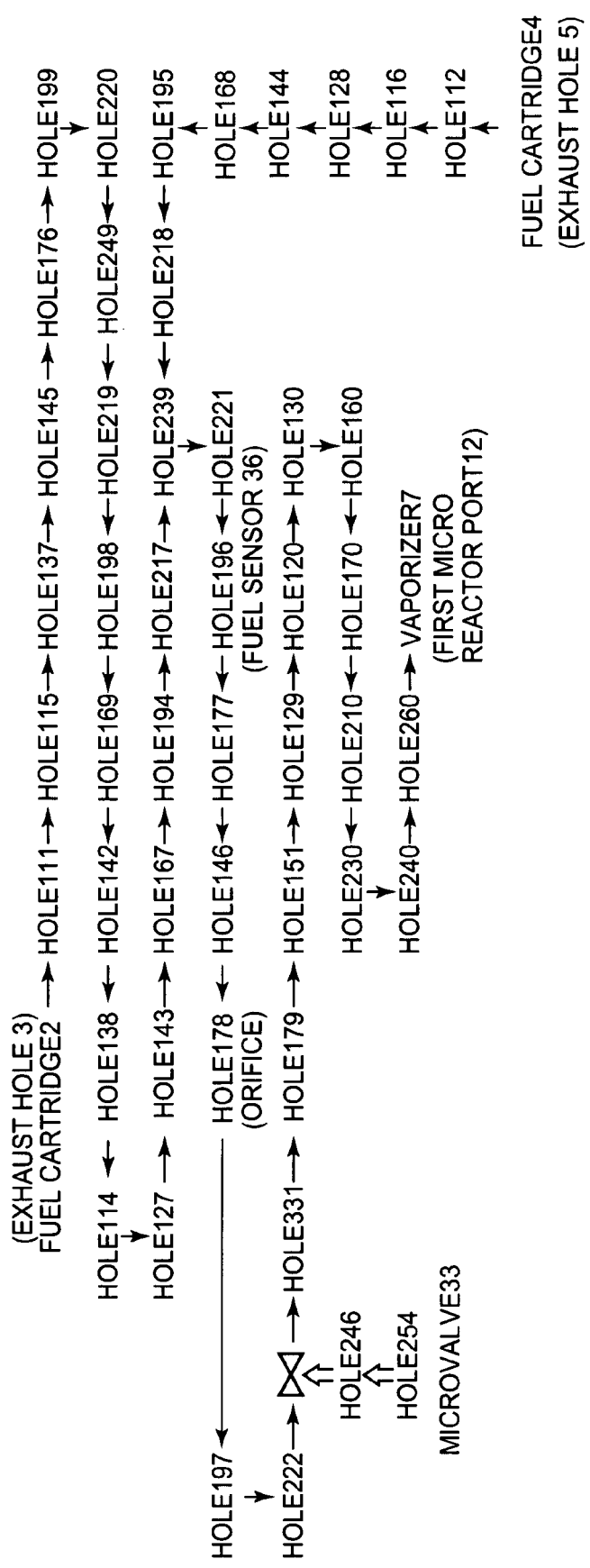
FIG. 15 illustrates a path of a fuel supply flow path from two fuel cartridges to a vaporizer.

FIG. 6 to FIG. 14 show plan views of the flow path plates 101 to 109, respectively. FIG. 6 to FIG. 14 are drawn with the same reduction factor and magnification factor and the flow path plates 101 to 109 have an equal length and an equal width. As shown in FIG. 6 to FIG. 14, in the flow path plates 101 to 109, holes and notches having various shapes are formed. By layering the flow path plates 101 to 109, a flow path composed of these holes and notches is provided. The paths of the formed flow path are shown in FIG. 15 to FIG. 20. FIG. 15 shows a fuel supply flow path from the fuel cartridge 2 and the fuel cartridge 4 to the first micro reactor port 12 leading to the vaporizer 7. FIG. 16 shows a hydrogen supply flow path from the sixth micro reactor port 17 as an output port from the carbon monoxide remover 9 to the first power generation cell port 24 leading to the anode 21. FIG. 17 shows a combustion gas supply flow path from the second power generation cell port 25 as an output port from the anode 21 to the fifth micro reactor port 16 leading to the combustor 10. FIG. 18 shows an exhaust gas flow path from the fourth micro reactor port 15 as an output port from the combustor 10 to outside. FIG. 19 shows paths of an air supply flow path from the exhaust port 32 of the air pump 30 and is branched to the third power generation cell port 26 leading to the cathode 22, to the second micro reactor port 13 leading to the carbon monoxide remover 9, and to the fifth micro reactor port 16 leading to the combustor 10, respectively. FIG. 20 shows an air exhaust flow path from the fourth power generation cell port 27 as an output port from the cathode 22 to outside. It is noted that a flow path from the fuel cartridge 2 and the fuel cartridge 4 to the vaporizer 7 is narrowed down at the hole 178, a flow path from the air pump 30 to the carbon monoxide remover 9 is narrowed down at the hole 181, a flow path from the air pump 30 to the combustor 10 is narrowed down at the hole 184, and these holes 178, 181, and 184 function as an orifice.

As shown in FIG. 3, the first micro reactor port 12 is engaged into a hole 260 of the flow path plate 109 at the uppermost layer, the second micro reactor port 13 is engaged into a hole 261, the third micro reactor port 14 is engaged into a hole 262, the fourth micro reactor port 15 is engaged into a hole 263, the fifth micro reactor port 16 is engaged into a hole 264, and the sixth micro reactor port 17 is engaged into a hole 265. The first power generation cell port 24 is engaged into a hole 259 of the flow path plate 109, the second power generation cell port 25 is engaged into a hole 257, the third power generation cell port 26 is engaged into a hole 258, and the fourth power generation cell port 27 is engaged into a hole 266. The exhaust port 32 of the air pump 30 is engaged into a hole 110 of the flow path plate 101 at the undermost layer.

The microvalve 33 is mounted on the multilayer substrate 100 so as to be engaged into a hole 254 of the flow path plate 109. This micro valve 33 permits or blocks the flow of mixed liquid flowing from the fuel cartridge 2 or the fuel cartridge 4 to the vaporizer 7. For example, there is a moving part that moves up and down in the thickness direction of the flow path and that opens or closes a flow path hole just below the microvalve in the multilayer substrate 100 to control the flow.

The microvalve 34 is mounted on the multilayer substrate 100 so as to be engaged into a hole 255 of the flow path plate 109. By the microvalve 34, the flow rate of air flowing from the air pump 30 to the carbon monoxide remover 9, is controlled. The microvalve 35 is mounted on the multilayer substrate 100 so as to be engaged into the hole 256. By the microvalve 35, the flow rate of air flowing from the air pump 30 to the cathode 22, is controlled.

The microvalves 34 and 35 have, for example, a moving part including a needle-like valving element moving up and down in the thickness direction of the flow path and controls the flow rate by changing the opening area of the flow path hole just below the microvalve in the multilayer substrate 100.

The flow rate sensors 36 to 38 are buried in the multilayer substrate 100. Specifically, the hole 196 of the flow path plate 106 is superposed on a hole 221 of the flow path plate 107 to form an internal space that stores therein a flow rate sensor 36. Thus, the flow rate sensor 36 is provided in a flow path from the fuel cartridge 2 and the fuel cartridge 4 to the vaporizer 7 so that the flow rate of the mixed liquid flowing from the fuel cartridge 2 and the fuel cartridge 4 to the vaporizer 7 can be detected by the flow rate sensor 36. Similarly, a flow rate sensor 37 is stored in an internal space provided by the hole 200 and the hole 225 so that the flow rate sensor 37 is provided in a flow path from the air pump 30 to the carbon monoxide remover 9 and the flow rate of air flowing from the air pump 30 to the carbon monoxide remover 9 is detected by the flow rate sensor 37. A flow rate sensor 38 is also stored in an internal space provided by a hole 201 and a hole 226 so that the flow rate sensor 38 is provided in an flow path from the air pump 30 to the combustor 10 and the flow rate of air flowing from the air pump 30 to the combustor 10 is detected by the flow rate sensor 38.

Figure 22:
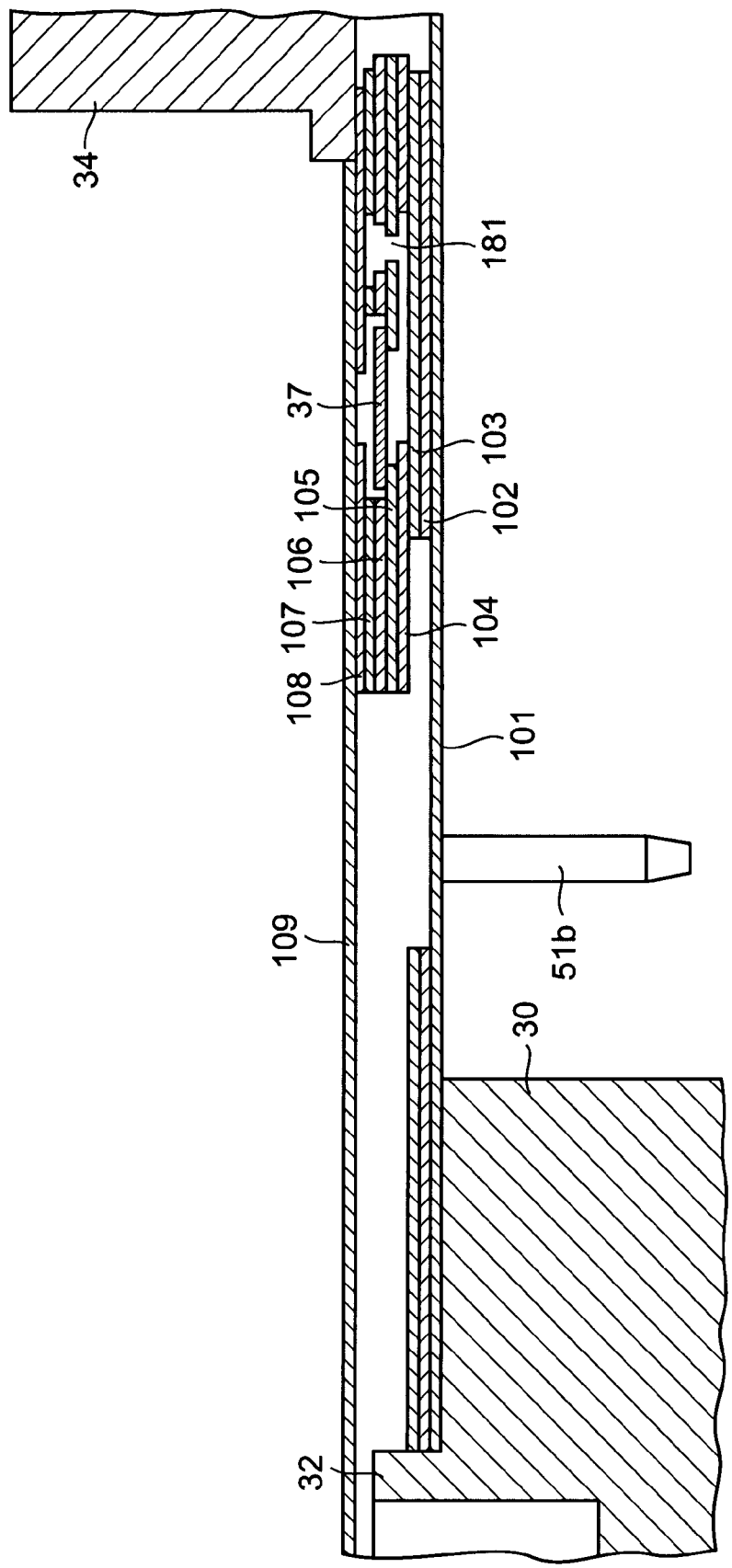
FIG. 22 is a cross-sectional view of a surface along a section line XXII-XXII of FIG. 2, which is seen from the direction indicated by an arrow.

The flow rate sensors 36 to 38 may be a hot-wire flow sensor disclosed in Japanese Patent Laid-Open Publication No. 2002-202168 or a piezoelectric-type semiconductive flow proportioner disclosed in the specification of U.S. Pat. No. 6,253,605. FIG. 3 and FIG. 22 were drawn based on an assumption of the use of the latter piezoelectric-type semiconductive flow proportioner.

Figure 21:
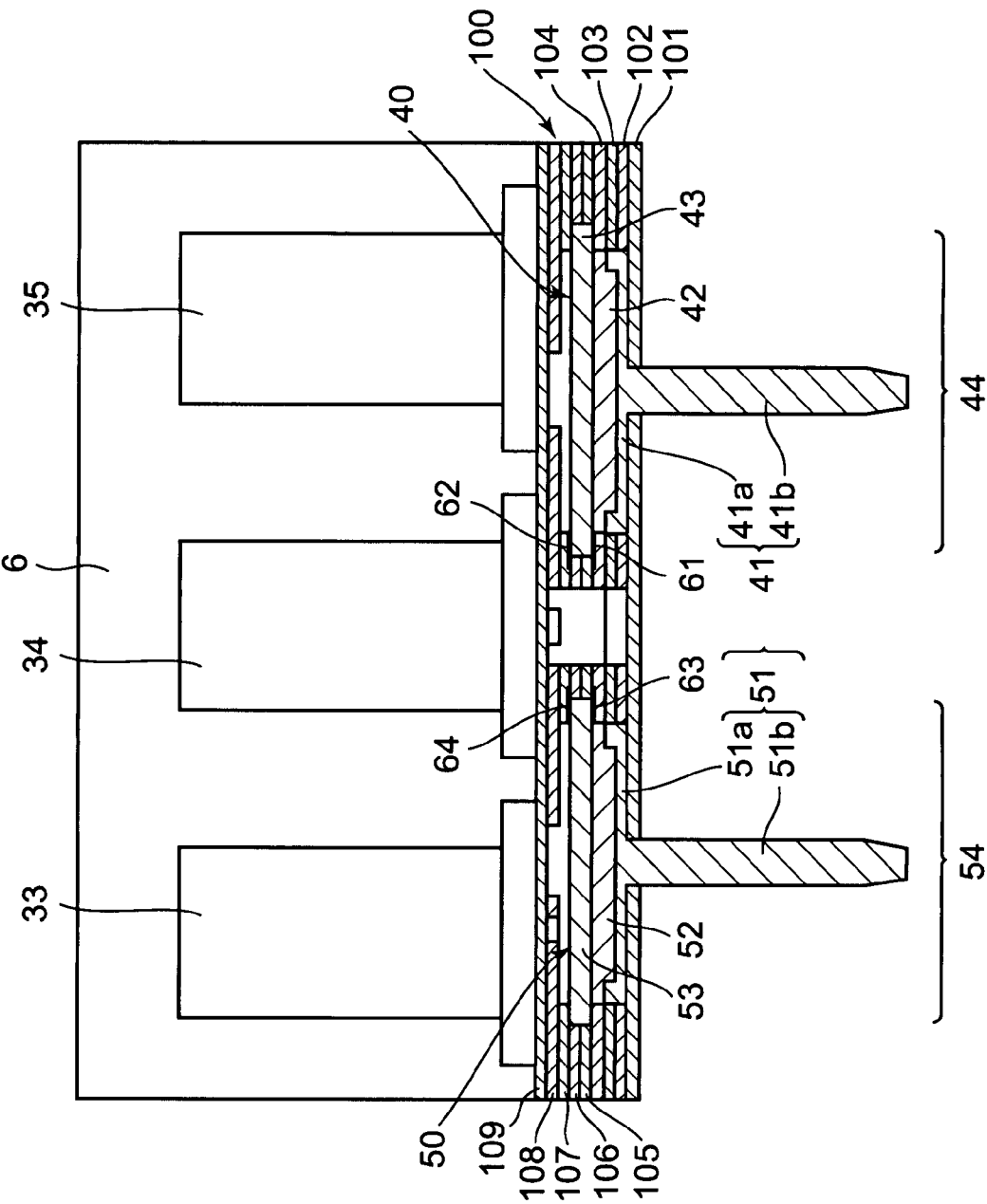
FIG. 21 is a cross-sectional view of a surface along a section line XXI-XXI of FIG. 2, which is seen from the direction indicated by an arrow.

FIG. 21 is a cross-sectional view of a surface along a section line XXI-XXI of FIG. 2, which is seen from the direction indicated by an arrow. FIG. 22 is a cross-sectional view of a surface along a section line XXII-XXII of FIG. 2, which is seen from the direction indicated by an arrow. As shown in FIG. 3, FIG. 21 and FIG. 22, the electro-osmotic flow pump 40 and the electro-osmotic flow pump 50 are buried in the multilayer substrate 100. On the electro-osmotic flow pump 40, a connecting structure 44 having the first liquid absorber 41 and the second liquid absorber 42, is stacked. The first liquid absorber 41 is obtained by integrating a disk section (plate-like member) 41*a* with a bar-like member 41*b* raised from the center of the disk section 41*a*. The first liquid absorber 41 has a hard porous structure that is made of porous metal or the like. The first liquid absorber 41 has a liquid absorbent property by which the first liquid absorber 41 can absorb liquid.

The second liquid absorber 42 is obtained by forming fiber material that is softer than the first liquid absorber 41 to have a disk-like shape. The second liquid absorber 42 is preferably made of material that has an improved hydrophilicity by combining material or a hydroxyl group with a high moisture permeability for fuel and water and a high hydrophilicity to the inner surface. For example, the second liquid absorber 42 is made of unwoven fabric such as rayon, or sponge. The second liquid absorber 42 has a liquid absorbent property to absorb liquid. The second liquid absorber 42 is also flexible and can be elastically deformed.

A surface of the second liquid absorber, which is opposite to a surface which is in contact with the first liquid absorber, is in contact with an electro-osmotic flow pump.

Figure 23:
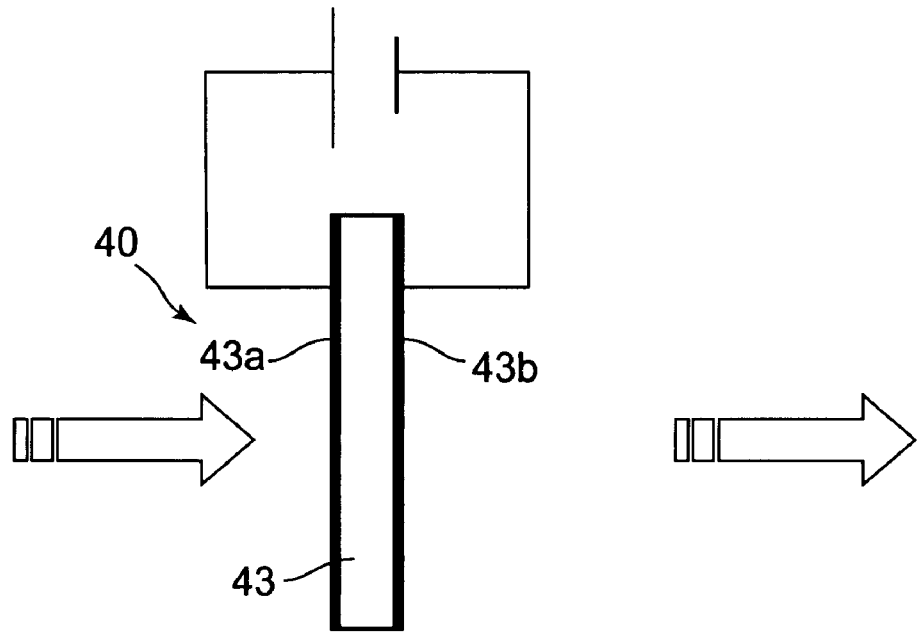
FIG. 23 is a schematic view illustrating an electro-osmotic flow pump.
Figure 24:
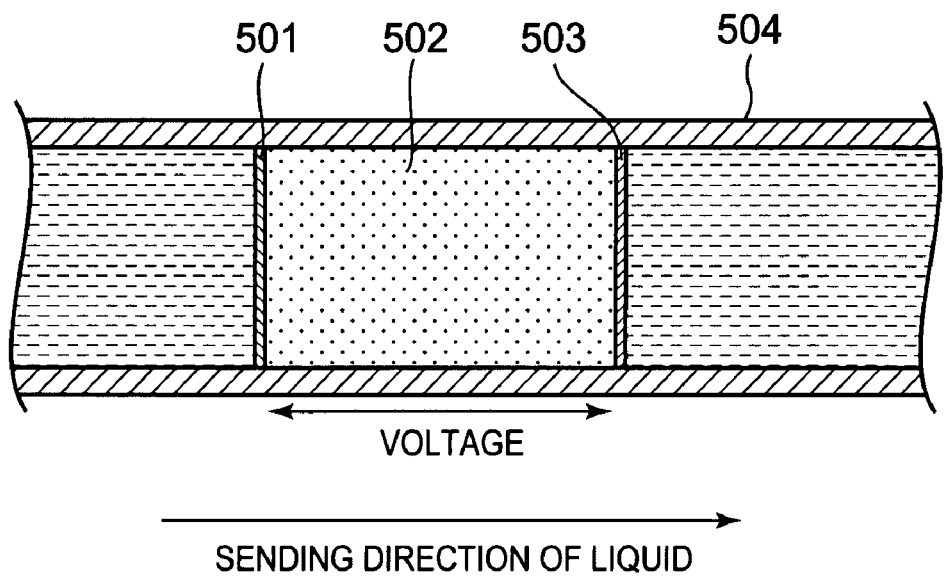
FIG. 24 is a view for explaining a principle of an electro-osmotic flow pump.

FIG. 23 is a schematic view illustrating the electro-osmotic flow pump 40. As shown in FIG. 3, FIG. 21, and FIG. 23, an electro-osmotic material 43 is formed to have a disk-like shape. On both surfaces of the electro-osmotic material 43, electrodes 43*a* and 43*b* are formed. The electro-osmotic material 43 may be made of dielectric porous material, fiber material, or particle filling material and may be made of silica fiber material as an example. For example, the electrodes 43*a* and 43*b* can be formed by depositing them to the electro-osmotic material 43.

As in the electro-osmotic flow pump 40, on the electro-osmotic flow pump 50, a connecting structure 54 having the first liquid absorber 51 and the second liquid absorber 52 is stacked. The first liquid absorber 51 and the second liquid absorber 52 of the connecting structure 54 are provided in the same manner as that in which the first liquid absorber 41 and the second liquid absorber 42 of connecting structure 44 are provided, respectively.

By superposing a hole 115 of a flow path plate 102, a hole 137 of a flow path plate 103, a hole 145 of a flow path plate 104, a hole 176 of a flow path plate 105, a hole 199 of a flow path plate 106, and a hole 220 of a flow path plate 107, an internal space is formed. A hole 111 having a smaller diameter than that of the hole 115 is provided in the flow path plate 101 and is communicated to the interior and exterior. The internal space stores therein the disk section 41*a* of the first liquid absorber 41. The bar-like member 41*b* of the first liquid absorber 41 is inserted to the hole 111. The bar-like member 41*b* protrudes at the lower face of the multilayer substrate 100. The second liquid absorber 42 is stacked on the disk section 41*a*. The electro-osmotic material 43 of the electro-osmotic flow pump 40 is stacked on the second liquid absorber 42. The electrode 43*a* of the electro-osmotic material 43 is on the second liquid absorber 42 side. The second liquid absorber 42 is sandwiched in the multilayer substrate 100 so that the electro-osmotic material 43 is layered on the second liquid absorber 42 to compress the second liquid absorber 42 and to provide a face contact between the second liquid absorber 42 and the electro-osmotic material 43.

A wiring pattern provided in a certain flow path plate layer in the multilayer substrate 100 is in contact with the electrodes 43*a* and 43*b* at both surfaces of the electro-osmotic material 43, respectively so that a voltage can be applied between both surfaces of the electro-osmotic material 43 via the wiring pattern. Specifically, the wiring pattern is provided on a surface which is on the flow path plate 105 side of the flow path plate 104 and the contact section 61 is in contact with the electrode 43*a* and the other wiring pattern is formed on a surface which is on the flow path plate 106 side of the flow path plate 107 and the contact section 62 is in contact with the electrode 43*b*.

As in the electro-osmotic flow pump 40, in the electro-osmotic flow pump 50, a disk section (plate-like member) 51*a* of the first liquid absorber 51, the second liquid absorber 52, and the electro-osmotic material 53 are layered in an internal space composed of a hole 116, a hole 128, a hole 144, a hole 168, a hole 195, and a hole 218 and the bar-like member 51*b* of the first liquid absorber 51 penetrates the hole 112. A contact section 63 of a wiring pattern formed on a surface which is on the flow path plate 105 side of the flow path plate 104, is in contact with one electrode of the electro-osmotic material 53. A contact section 64 of a wiring pattern formed on a surface which is on the flow path plate 106 side of the flow path plate 107, is in contact with the other electrode of the electro-osmotic material 53.

In a situation that the fuel cartridge 2 is attached, the bar-like member 41b of the first liquid absorber 41 is inserted into the fuel exhaust hole 3 of the fuel cartridge 2. The bar-like member 41b is inserted into a check valve in the fuel exhaust hole 3. The check valve is opened by the bar-like member 41b. On the other hand, when the fuel cartridge 2 is detached, the bar-like member 41b is disengaged from the fuel exhaust hole 3 and the check valve to close the check valve.

In a situation that the fuel cartridge 4 is attached, the bar-like member 51b of the first liquid absorber 51 is similarly inserted into the fuel exhaust hole 5 of the fuel cartridge 4. The bar-like member 51b is inserted into a check valve in the fuel exhaust hole 5 and the check valve is opened by the bar-like member 51b. On the other hand, when the fuel cartridge 4 is detached, the bar-like member 51b is disengaged from the fuel exhaust hole 5 and the check valve to close the check valve.

Next, the operation of this fuel cell-type power generation device 1 will be described.

When the bar-like member 41b is inserted into the fuel exhaust hole 3 of the fuel cartridge 2, the bar-like member 41b is in contact with the mixed liquid in the fuel cartridge 2. Then, the mixed liquid is absorbed by the bar-like member 41b by a capillary force and permeates the disk section 41a. The mixed liquid permeating the disk section 41a is absorbed by the second liquid absorber 42 which is in contact with the disk section 41a. The mixed liquid absorbed by the second liquid absorber 42 is also absorbed by the electro-osmotic material 43 which is in contact with the second liquid absorber 42.

In the above status, because the second liquid absorber 42 is compressed, a capillary force is strengthened to sufficiently supply the mixed liquid. Furthermore, the second liquid absorber 42 is compressed and both surfaces thereof are in contact with the disk section 41a and the electro-osmotic material 43. Therefore, an effect to secure the permeation of the mixed liquid from the disk section 41a to the electro-osmotic material 43 is obtained.

When a voltage is applied in an appropriate direction between the electrodes 43a and 43b in this situation in a manner as described later, the mixed liquid in electro-osmotic material 43 flows from the second liquid absorber 42 (electrode 43a) to an opposite side (electrode 43b) and the mixed liquid flows from this opposite surface to the exterior of the electro-osmotic material 43. Therefore, a flow of the mixed liquid is caused to send the mixed liquid to the vaporizer 7. When the dielectric material of the electro-osmotic material 43 is in contact with the mixed liquid to negatively charge the dielectric material, a voltage is applied so that the electrode 43a has a higher potential than that of the electrode 43b. When the dielectric material of the electro-osmotic material 43 is in contact with the mixed liquid to positively charge the dielectric material, a voltage is applied so that the electrode 43a has a lower potential than that of the electrode 43b.

The mixed liquid in the fuel cartridge 4 is sent by inserting the bar-like member 51b to the fuel exhaust hole 5 to apply a voltage between electrodes at both surfaces of the electro-osmotic material 53 as in the case of the electro-osmotic material 43. It is noted that the mixed liquid in the fuel cartridge 2 and the mixed liquid in the fuel cartridge 4 may be simultaneously sent or may be separately sent.

By the function of the electro-osmotic flow pump 40 and the electro-osmotic flow pump 50 as described above, the mixed liquid is sent from the fuel cartridge 2 and the fuel cartridge 4 to the vaporizer 7 (see FIG. 15).

On the other hand, when the air pump 30 operates, outside air is sucked by the air pump 30 via the air filter 31. The sucked air is sent via the exhaust port 32 to the carbon monoxide remover 9, the combustor 10 and the cathode 22 (see FIG. 19).

The mixed liquid sent to the vaporizer 7 is vaporized by the vaporizer 7. The mixture gas of fuel and water vaporized by the vaporizer 7 is sent to the reformer 8. In the reformer 8, hydrogen and carbon dioxide are generated by a reforming reaction catalyst out of the mixture gas supplied from the vaporizer 7. Further, a minute amount of carbon monoxide is also generated. It is noted that, when mixed liquid of methanol and water is stored in the fuel cartridge 2 or the fuel cartridge 4, catalyst reactions shown by chemical reaction formulae (1) and (2) are caused in the reformer 8.

$$CH_3OH + H_2O \rightarrow 3H_2 + CO_2 \tag{1}$$

$$H_2 + CO_2 \rightarrow H_2O + CO \tag{2}$$

The mixture gas generated by the reformer 8 is supplied to the carbon monoxide remover 9 to mix the gas with air. In the carbon monoxide remover 9, the carbon monoxide gas in the mixture gas is preferentially oxidized (burned) by selective oxidation reaction catalyst as shown in a chemical reaction formula (3). Therefore, carbon monoxide is removed.

$$2CO + O_2 \rightarrow 2CO_2 \tag{3}$$

The mixture gas from which carbon monoxide is removed includes hydrogen gas. The mixture gas is supplied from the sixth micro reactor port 17 via the first power generation cell port 24 to the anode 21 of the power generation cell 20 (see FIG. 16). Air is supplied to the cathode 22 from the exhaust port 32 of the air pump 30 via the third power generation cell port 26 (see FIG. 19). Then, hydrogen in the mixture gas, which is supplied from the sixth micro reactor port 17, via the first power generation cell port 24 to the anode 21, reacts with oxygen in air supplied to the cathode 22 via the electrolyte membrane 23 so as to cause an electric chemical reaction. Therefore, electric power between the anode 21 and the cathode 22 is generated.

It is noted that, when the electrolyte membrane 23 is a hydrogen ion-permeable electrolyte membrane (e.g., solid polymer electrolyte membrane), the reaction is caused in the anode 21 as shown in the following formula (4). Then, hydrogen ions generated in the anode 21 permeate the electrolyte membrane 23. In the cathode 22, the reaction is caused as shown in the following formula (5).

$$H_2 \rightarrow 2H^+ + 2e^- \tag{4}$$

$$2H^+ + \tfrac{1}{2}O_2 + 2e^- \rightarrow H_2O \tag{5}$$

Unreacted air in the cathode 22 is exhausted from the fourth power generation cell port 27 to outside (see FIG. 20). The mixture gas including unreacted hydrogen is sent from the second power generation cell port 25 as an output port of the anode 21 via the fifth micro reactor port 16 to the combustor 10 (see FIG. 17). Air is additionally supplied to the combustor 10 from the exhaust port 32 of the air pump 30 via the third micro reactor port 14 (see FIG. 19). Then, in the combustor 10, hydrogen is oxidized to generate combustion heat. By the combustion heat, the vaporizer 7, the reformer 8 and the carbon monoxide remover 9 are heated. Then, the mixture gas including various products is exhausted from the fourth micro reactor port 15 as an output port of the combustor 10 to outside (see FIG. 18).

In this embodiment, the second flexible liquid absorber 42 is sandwiched between the first liquid absorber 41 and the electro-osmotic material 43. Thus, the second liquid absorber 42 is compressed to cause the second liquid absorber 42 to have a face contact with the electro-osmotic material 43 and with the first liquid absorber 41. When the first liquid absorber 41 is in contact with liquid, the liquid is absorbed by the first liquid absorber 41. The absorbed liquid permeates from the first liquid absorber 41 to the second liquid absorber 42 and further permeates the electro-osmotic material 43. Since the second liquid absorber 42 has a face contact with the electro-osmotic material 43 and with the first liquid absorber 41, the mixed liquid easily permeates from the first liquid absorber 41 to the second liquid absorber 42 and the mixed liquid easily permeates from the second liquid absorber 42 to the electro-osmotic material 43 when the electro-osmotic flow pump 40 is started. Thus, the mixed liquid can be sent immediately after the start of the electro-osmotic flow pump 40 without deteriorating the original performance of an electro-osmotic flow pump.

Furthermore, because the second liquid absorber 42 is flexible, the first liquid absorber 41 can be harder than the second liquid absorber 42. Thus, even when the bar-like member 41b of the first liquid absorber 41 protrudes from the multilayer substrate 100, the bar-like member 41b is hardly damaged to prevent the function of the electro-osmotic flow pump 40 from being deteriorated. Furthermore, because the bar-like member 41b is made of hard material, the bar-like member 41b is hardly bent. The bar-like member 41b is easily inserted into the fuel exhaust hole 3 of the fuel cartridge 2.

Furthermore, the mixed liquid in the fuel cartridge 2 can permeate the electro-osmotic material 43 by a capillary phenomenon. Thus, air bubbles are hardly contained in the mixed liquid sent from the electro-osmotic material 43 to the vaporizer 7, the flow rate control is more reliable. Furthermore, when the fuel in the fuel cartridge 2 permeates the first liquid absorber 41, the second liquid absorber 42, and the electro-osmotic material 43, foreign material in the mixed liquid is caught by the first liquid absorber 41, the second liquid absorber 42, and the electro-osmotic material 43. Thus, although it depends on the size of the pore, high resistance to contamination by foreign materials of about few dozens of microns can be obtained.

Furthermore, because the flow path control section 60 is structured so that the flow rate sensors 36 to 38 and the electro-osmotic flow pumps 40 and 50 are buried in the multilayer substrate 100, the flow path and the wiring of the flow path control section 60 are arranged with a higher density. The size of the flow path control section 60 can be smaller.

Furthermore, the flow path formed in the multilayer substrate 100 is arranged in a three-dimensional manner. Thus, the length of the flow path can be shorter, and the time constant for the flow rate control can be smaller.

The entire disclosure of Japanese Patent Application No. 2006-088205, filed on Mar. 28, 2006, Japanese Patent Application No. 2006-251109, filed on Sep. 15, 2006, including specifications, claims, drawings and summaries are incorporated herein by reference in their entirety.

Although various typical embodiments have been illustrated and described, the present invention is not limited to these embodiments. Thus, the scope of the present invention is limited only by the following claims.

What is claimed is:

1. A connecting structure for connecting to an electro-osmotic flow pump having electrodes formed on both surfaces of an electro-osmotic material, the connecting structure comprising:
   a first liquid absorber which is adapted to absorb liquid and which is made of a porous material; and
   a second liquid absorber which is adapted to absorb the liquid, wherein the second liquid absorber is superposed on the first liquid absorber, is flexible and soft, and has a plate-like shape;
   wherein the first liquid absorber is harder than the second liquid absorber,
   wherein the first liquid absorber is formed by integrating a plate-like member with a bar-like member raised from the plate-like member, and the second liquid absorber is superposed on the plate-like member so as to have face contact between a first surface of the second liquid absorber and a surface of the plate-like member,
   wherein a second surface of the second liquid absorber, which is opposite to the first surface that is in face contact with the first liquid absorber, is in face contact with one of the surfaces of the electro-osmotic material,
   wherein the second liquid absorber is arranged so as to be compressed by the first liquid absorber and the electro-osmotic material,
   wherein the second liquid absorber has a higher capillary force for absorbing the liquid than the first liquid absorber when the second liquid absorber is compressed by the first liquid absorber and the electro-osmotic material, and
   wherein the liquid is adapted to flow from the first liquid absorber to the second liquid absorber.

2. The connecting structure according to claim 1, wherein:
   the second liquid absorber, the electro-osmotic material and the plate-like member are provided in a flow path formed in a substrate and the bar-like member protrudes to outside of the substrate.

3. The connecting structure according to claim 2, wherein:
   the substrate comprises a plurality of substrates, and
   wiring patterns patterned in layers of the plurality of substrates are in contact with the electrodes of the electro-osmotic material.

4. A flow path control section, comprising:
   a substrate comprising a flow path therein;
   a first liquid absorber which is adapted to absorb liquid, the first liquid absorber being formed by integrating a plate-like member with a bar-like member raised from the plate-like member, and the first liquid absorber being made of a porous material;
   a second liquid absorber which is adapted to absorb the liquid, wherein the second liquid absorber being is superposed on the plate-like member, is flexible and soft, and has a plate-like shape; and
   an electro-osmotic material superposed on the second liquid absorber and having electrodes respectively formed on a first surface which is in contact with the second liquid absorber and a second surface which is opposite the first surface,
   wherein the first liquid absorber is harder than the second liquid absorber,
   wherein the second liquid absorber is superposed on the plate-like member so as to have face contact between a first surface of the second liquid absorber and a surface of the plate-like member,
   wherein a second surface of the second liquid absorber, which is opposite to the first surface that is in face contact with the first liquid absorber, is in face contact with the first surface of the electro-osmotic material, wherein the second liquid absorber is arranged so as to be compressed by the first liquid absorber and the electro-osmotic material, wherein the second liquid absorber has a higher capillary force for absorbing the liquid than the first liquid absorber when the second liquid absorber is compressed by the first liquid absorber and the electro-osmotic material, wherein the liquid is adapted to flow from the first liquid absorber to the second liquid absorber, and wherein the second liquid absorber, the electro-osmotic material and the plate-like member are provided in the flow path formed in the substrate and the bar-like member protrudes to outside of the substrate.

5. The flow path control section according to claim 4, wherein:
the substrate comprises a plurality of substrates, and
wiring patterns patterned in layers of the plurality of substrates are in contact with the electrodes of the electro-osmotic material.

6. A fuel cell-type power generation device, comprising:
a flow path control section; and
a power generation cell for taking out electricity from liquid supplied to the flow path control section;
wherein the flow path control section comprises:
a substrate comprising a flow path therein;
a first liquid absorber which is adapted to absorb the liquid, the first liquid absorber being formed by integrating a plate-like member with a bar-like member raised from the plate-like member, and the first liquid absorber being made of a porous material;
a second liquid absorber which is adapted to absorb the liquid, wherein the second liquid absorber is superposed on the plate-like member, is flexible and soft, and has a plate-like shape; and
an electro-osmotic material superposed on the second liquid absorber and having electrodes respectively formed on a first surface which is in contact with the second liquid absorber and a second surface which is opposite the first surface,
wherein the first liquid absorber is harder than the second liquid absorber,
wherein the second liquid absorber is superposed on the plate-like member so as to have face contact between a first surface of the second liquid absorber and a surface of the plate-like member,
wherein a second surface of the second liquid absorber, which is opposite to the first surface that is in face contact with the first liquid absorber, is in face contact with the first surface of the electro-osmotic material,
wherein the second liquid absorber is arranged so as to be compressed by the first liquid absorber and the electro-osmotic material,
wherein the second liquid absorber has a higher capillary force for absorbing the liquid than the first liquid absorber when the second liquid absorber is compressed by the first liquid absorber and the electro-osmotic material,
wherein the liquid is adapted to flow from the first liquid absorber to the second liquid absorber, and
wherein the second liquid absorber, the electro-osmotic material and the plate-like member are provided in the flow path formed in the substrate and the bar-like member protrudes to outside of the substrate.

7. The fuel cell-type power generation device according to claim 6, wherein:
the substrate comprises a plurality of substrates, and
wiring patterns patterned in layers of the plurality of substrates are in contact with the electrodes of the electro-osmotic material.

8. An electronic apparatus, comprising:
a fuel cell-type power generation device comprising:
a flow path control section; and
a power generation cell for taking out electricity from liquid supplied to the flow path control section; and
an electronic apparatus body that operates based on the electricity generated by the fuel cell-type power generation device;
wherein the flow path control section comprises:
a substrate comprising a flow path therein;
a first liquid absorber which is adapted to absorb the liquid, the first liquid absorber being formed by integrating a plate-like member with a bar-like member raised from the plate-like member, and the first liquid absorber being made of a porous material;
a second liquid absorber which is adapted to absorb the liquid, wherein the second liquid absorber is superposed on the plate-like member, is flexible and soft, and has a plate-like shape; and
an electro-osmotic material superposed on the second liquid absorber and having electrodes respectively formed on a first surface which is in contact with the second liquid absorber and a second surface which is opposite the first surface,
wherein the first liquid absorber is harder than the second liquid absorber,
wherein the second liquid absorber is superposed on the plate-like member so as to have face contact between a first surface of the second liquid absorber and a surface of the plate-like member,
wherein a second surface of the second liquid absorber, which is opposite to the first surface that is in face contact with the first liquid absorber, is in face contact with the first surface of the electro-osmotic material,
wherein the second liquid absorber is arranged so as to be compressed by the first liquid absorber and the electro-osmotic material,
wherein the second liquid absorber has a higher capillary force for absorbing the liquid than the first liquid absorber when the second liquid absorber is compressed by the first liquid absorber and the electro-osmotic material,
wherein the liquid is adapted to flow from the first liquid absorber to the second liquid absorber, and
wherein the second liquid absorber, the electro-osmotic material and the plate-like member are provided in the flow path formed in the substrate and the bar-like member protrudes to outside of the substrate.

9. The electronic apparatus according to claim 8, wherein:
the substrate comprises a plurality of substrates, and
wiring patterns patterned in layers of the plurality of substrates are in contact with the electrodes of the electro-osmotic material.

* * * * *